United States Patent [19]

Beerens

[11] 4,131,038

[45] Dec. 26, 1978

[54] GUIDE DEVICE FOR SHARPENING SAWS

[76] Inventor: Cornelis J. Beerens, 16 Anchorage St., Merville Village, Paranaque, Rizal, Philippines

[21] Appl. No.: 813,848

[22] Filed: Jul. 8, 1977

[30] Foreign Application Priority Data

Jul. 8, 1976 [AU] Australia .............................. 6582/76

[51] Int. Cl.² ........................................... B23D 63/10
[52] U.S. Cl. ................................................. 76/25 A
[58] Field of Search ................ 76/36, 25 A, 25 R, 31, 76/74, 78 A

[56] References Cited

U.S. PATENT DOCUMENTS

| 3,071,987 | 1/1963 | Kopare | 76/36 |
|---|---|---|---|
| 3,093,016 | 6/1963 | Spence | 76/36 |
| 3,322,000 | 5/1967 | Newman | 76/36 |
| 3,338,116 | 8/1967 | McLean | 76/36 |
| 3,494,228 | 2/1970 | Sian | 76/36 |

Primary Examiner—Nicholas P. Godici
Assistant Examiner—Roscoe V. Parker
Attorney, Agent, or Firm—Wigman & Cohen

[57] ABSTRACT

A file guide device for use in guiding a file in the operation of sharpening the teeth of saws and the like is disclosed. The device comprises a support member adapted to be fitted to a saw in a predetermined relation to the teeth thereof and a carrier member mounted to the support member for rotatably supporting a pair of rollers for guiding the file along axes corresponding to the angles of the cutting edges of the saw teeth. In one embodiment, the axes of the rollers are arranged in a fixed location with respect to the support member and are arranged so that the roller rotation plane is substantially horizontal. In another embodiment, one roller is movably mounted relative to the support member and is resiliently biased in a direction to move the file axis toward the cutting edge of a saw tooth.

8 Claims, 7 Drawing Figures

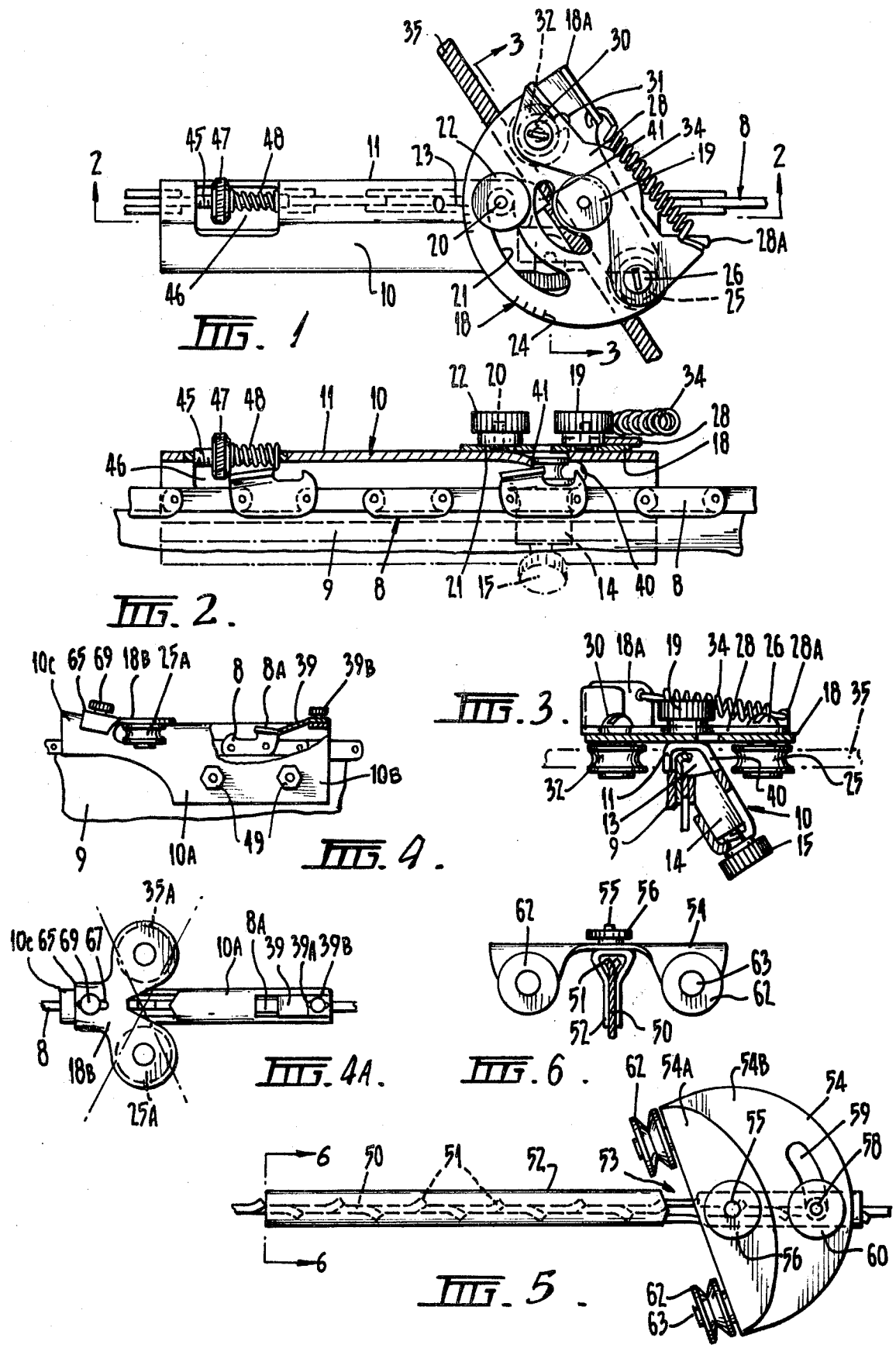

GUIDE DEVICE FOR SHARPENING SAWS

This invention relates to a file guide device to be used to guide a file in the operation of sharpening the teeth of a saw. A number of guide devices are known for this purpose some of which merely provide a sight line for the operator to observe during the sharpening operation, and others which positively guide the file in the required path.

An example of the sight line type of guide is disclosed in Australian Pat. No. 408,421 wherein a metal plate is provided with suitably disposed and shaped notches so that the plate may rest upon the chain of a chain saw with at least the tooth to be sharpened located in one notch in the plate and an adjacent tooth supporting the plate. The edge of the plate adjacent the notch which receives the tooth is formed at an angle corresponding to the angle at which the tooth should be sharpened, so that the operator may then sight the file with respect to this edge in an endeavour to maintain the correct angle of the file to the tooth during the sharpening operation. This device has the initial disadvantage that it still requires the operator to exercise skill in maintaining the file correctly aligned with the edge of the guide plate, and this alignment must be maintained while the operator is firstly, reciprocating the file across the cutting edge of the tooth, and at the same time, applying pressure to the file to hold it in cutting engagement with the tooth. Accordingly there is still a high risk that the operator will impart a rocking movement to the file during the sharpening operator so that the tooth is not sharpened at the correct angle.

Another simple form of guide for sharpening hands saws is disclosed in Australian Pat. No. 160,234 wherein a member is clamped to the saw so as to straddle the teeth to be sharpened, and a roller is disposed on each side of the saw supported by the member to rotate about respective axes parallel to the length of the saw. The height of the rollers relative to the point of the teeth on the saw may be set so that the rollers act as a depth gauge, whilst the member also carries and adjustable guide plate having portions extending across the teeth at an angle corresponding to the angle at which the teeth should be sharpened. The file is rested against this guide plate during the sharpening operation which continues until the file has cut to a depth so that it engages the rollers. In this device, the face of the guide which is contacted by the file must inherently wear by the continual contact with the file and hence the accuracy of the guide is not maintained. In addition, as the file used for sharpening such saws is of a triangular cross-section, grooves will be cut in the guide by the file which will make it difficult to operate the file without becoming lodged in such grooves. Finally, when the file reaches the required depth and contacts the rollers, a binding situation will arise for as the file is attempting to move across the rollers at an inclination to their axes, it will also endeavour to move along the rollers, but this will be prevented by the teeth of the saw and a binding or lock-up situation will occur.

Austrailian Pat. Nos. 8058/27 and 249518 both describe sharpening guides wherein the file is positively guided at the required angle to the saw teeth, but in each instance, these devices are quite complicated and not suitable to sharpening of saws in the field. The capability of sharpening of saws in the field is of major importance in regard to chain saws where the frequency of sharpening is quite high and under adverse working conditions, it may be necessary to sharpen a chain saw more than once a day.

Another particular problem in sharpening chain saws, apart from maintaining the correct angle on the cutting face of the tooth, is that the operator whilst imparting the necessary reciprocating motion to the file must also apply pressure in a direction transverse to this motion to maintain the file in engagement with the cutting edge of the tooth. The need to apply this pressure in the transverse direction renders it difficult for the operator to maintain the correct angle of the file to the direction of the length of the saw. The maintenance of this transverse pressure is also relevant to the sharpening of a chain saw to maintain the file at the correct height in relation to the top face of the tooth being sharpened. These problems are made more difficult by the fact that normally the file is operated by one hand only, the other hand being used to hold the chain steady.

It is the object of this invention to provide a file guide device for use in sharpening the teeth of a saw which is of simple construction, convenient to use, and requires a minimum of skill by the operator.

With the above stated object in view there is provided a file guide device for use in sharpening the teeth of a saw comprising a support member adapted to be fitted to a saw in a predetermined relation to the teeth of the saw, a pair of parallel rollers mounted for rotation in the roller rotation plane on respective axes, said rollers being carried by the support member, each roller having the peripheral surface thereof defining a seat for a file to be used to sharpen the saw teeth, said roller rotation plane and the axes of the rollers being arranged so that upon the support member being fitted to the saw a file seated in said seats on both rollers will have an inclination to the saw plane substantially equal to the angle of the cutting edge of the saw teeth.

In order to simplify the description and definition of the invention, throughout the specification and claims, the terms listed below are to be interpreted in accordance with the definitions specified.

Saw Plane — is the plane in which the teeth of the saw move when the saw is effecting a vertical cut.

Roller Axial Plane — is the single plane containing the axis of both the rollers on which the file is seated when in use.

Roller Rotation Plane — is the single plane in which both rollers rotate on their respective axes.

File Line — is the line along which the axis of the file reciprocates when the file is seated on the rollers.

It will be appreciated that the teeth of a saw are generally arranged so that the cutting edge on alternate teeth is on the opposite side of the saw and accordingly when sharpening one tooth must be sharpened at an inclination to the saw plane and the next tooth sharpened at the opposite inclination to the saw plane. Accordingly any file guide device for sharpening a saw must be capable of being used to guide the file when operating in each of the two opposite inclinations to the saw plane.

This may be achieved if the guide is only to be used at one preselected inclination to the saw plane by arranging the diameter of the rollers and the distance between their axes so that the file may be seated on the rollers in either of two positions of equal and opposite inclination to the saw plane. If desired the inclination may be adjusted by adjusting the distance between the axes of the rollers. Thus, the file is placed on the rollers in one of these positions to file a group of teeth having the cutting edge on one side of the saw and then is placed in the opposite position to sharpen the teeth having the cutting edge on the other side of the saw. Alternatively, the rollers may be mounted on a member or plate which is pivotally adjustable relative to the saw plane so that it may be set in either of two opposite positions which correspond to the two opposite inclinations required for sharpening the alternate teeth of the saw.

As previously mentioned, one of the problems with sharpening saws and in particular chain saws, is the necessity for the operator to apply pressure in a direction transverse to the direction of reciprocation of the file during the sharpening operation. The present file guide device may be adapted to overcome this problem so that the transverse pressure is applied to the file by the device and not by the operator. For this purpose the support member of the device is adapted to be attached to the saw in a predetermined relationship to the teeth of the saw and at least one of the rollers is mounted on an independent member. This independent member is supported for limited movement relative to the support member to effect movement of the file line to or from the cutting edge of the tooth to be sharpened. Means are then provided to urge the independent member to move in a direction to move the file line towards the cutting edge and thus these means apply pressure to the file to hold it in engagement with the cutting edge. The means urging the independent member to move may be a resilient member such as a spring. Pressure engagement between the cutting edge of the tooth and the file may also be achieved by the groove in the roller having a face inclined towards the cutting edge so that downward pressure on th file also presses the file against the cutting edge.

It will be appreciated that because of the provision of rollers having peripheral surfaces which form a seat for the file there will be negligible wear on the guide for the file as the rollers are free to rotate as the file moves relative thereto and consequently there is negligible cutting action between the file and the rollers. Also because of the rolling contact between the file and the rollers, the friction force therebetween is negligible and thus it is easier for the operator to effect the necessary reciprocating movement of the file. Finally, when the means are provided to urge one or both of the rollers in a direction towards the cutting edge of the tooth being sharpened, the operator is again relieved of the necessity of applying pressure in the transverse direction to the direction of reciprocation in order to maintain the file in cutting contact with the cutting edge, and thus the sharpening operation can be carried out with greater ease and speed and with greater accuracy.

The invention will be more readily understood from the following description of several practical arrangements of the file guide device as illustrated in the accompanying drawings.

In the drawings:

FIG. 1 is a plan view of the file guide device shown fitted to portion of a chain of a chain saw, FIG. 2 is a sectional view along line 2—2 in FIG. 1, FIG. 3 is a sectional view along line 3—3 in FIG. 1, FIG. 4 is a simplified side view of a modified form of the file guide device shown in FIG. 1 which may be directly clamped to the blade of a chain saw, FIG. 4A is a plan view of the device shown in FIG. 4.

FIG. 5 is a plan view similar to FIG. 1 of a file guide device particularly suitable for sharpening a hand saw, FIG. 6 is a sectional view along line 6—6 in FIG. 5.

Referring now to FIGS. 1, 2 and 3 of the drawings the file guide depicted therein is shown fitted to the chain 8 of a chain saw with that chain located upon the saw blade 9. It is however to be understood that the same basic construction may be used for sharpening chains not mounted on the saw blade, and also for sharpening conventional hand saws or circular saws. In adapting the guide as shown in the drawings for use on these other saws the principal component which is subject to modification is the support member 10 by which the device is secured to or in relation to the saw to be sharpened.

In the file guide device as illustrated the support member 10 has a generally channel shaped upper portion 11 to receive the chain 9 through the slot 13 which extends the full length of the support member 10. The wedge member 14 is disposed within the support member 10 and the adjusting screw 15 threadably engages the wedge member 14, and is free to rotate in the support member but is constrained against axial movement relative thereto. Thus by operation of the adjusting screw 15 the wedge member 14 is moved within the support member to selectively clamp or release the chain between the wedge member 14 and the upper channel shaped portion 11 of the support member. As a result of the support member being clamped to the chain the guide device also provides a convenient means for the operator to grip the chain and manually slide it along the blade when required, and thus reduce the likelihood of the operator injuring his hand when moving the chain. However, it is to be understood that the support member may, if required be modified so that it is clamped to the blade 9 or to both the chain and blade of the chain saw, or in the case of a hand saw or circular saw, the support member 10 may be clamped or otherwise secured to the saw blade.

The carrier member 18 is pivotally mounted on the support member 10 by the screw 19, for limited angular movement in a plane transverse to the saw plane. The lock screw 20 is secured to the support member and extends through the arcuate slot 21 in the carrier member 18. The lock nut 22 engages the screw 20 and upon tightening the nut 22 the carrier member may be locked at any selected angular position relative to the support member 10 within the limits of movement determined by the length of the slot 21. In order to assist in the setting of the angular position of the carrier member 18, the base reference mark 23 is provided on the support member 10 and graduation marks 24 are provided on the carrier member. The extent of the graduations 24 may be selected in accordance with the intended use of the guide device and for conventional chain saws graduations covering inclinations varying between 20° and 35° either side of the neutral position is normally sufficient. The graduations may be in 5° intervals.

It will be appreciated that in sharpening saws generally alternate teeth on the saw are sharpened at opposite angles to the saw plane and thus the neutral position of the carrier member 18 referred to above, is when the file line is at right angles to the saw plane, and in order to sharpen each alternate tooth, the carrier member must be set at the appropriate angle to the saw plane. It will also be appreciated that in order to avoid resetting the position of the carrier member for each tooth, it is customary to set the carrier member to suit one angle and then sharpen each alternate tooth along the full length of the saw and then reset the carrier member to sharpen the remaining teeth at the opposite angle.

The roller 25 is rotatably mounted by the screw 26 to the carrier member 18. The screw 26 also pivotally attaches the arm 28 to the carrier member 18. The screw 30 extends through the slot 31 in the carrier member 18 and rotatably supports the roller 32 to the arm 28.

The rollers 25 and 32 are thus mounted for rotation about parallel axes and are disposed to rotate in a common plane herein defined as the roller rotation plane. The rollers 25 and 32 each have a concave peripheral surface which provides a seating for a round file 35. It will be understood that when the file 35 is seated on both of the rollers and subject to the normal reciprocating movement, the rollers will rotate on their respective axes so that there is a negligible cutting action between the file and the rollers.

By the provision of the rollers 32 and 25 in which the file 35 is seated the file when in use, will move along a file line inclined to the saw plane in accordance with the selected angular position of the carrier member 18 to the reference mark 23 on the support member and thus by correct selection of this angle the teeth on the saw are sharpened at the correct angle to the saw plane.

The spring 34 is connected between the end portion 28A of the arm 28 and the flange 18A on the carrier member 18, so as to cause the arm 28 to pivot about the screw 26 in a direction to move the roller 32 in the anti-clockwise direction as viewed in FIG. 1. The extent of this movement is limited by the extent of the slot 31 in the carrier member. Provided the arm 28 is not at the limit of its travel in the anti-clockwise direction, the spring 34 applies a pressure to the file 35 through the roller 32 to maintain the file 35 in engagement with the tooth being sharpened. This pressure is maintained until the tooth has been filed to an extent that the arm has reached the limit of its travel in the anti-clockwise direction. The operator is thus not required to apply this pressure to maintain the cutting action between the file and the tooth being sharpened, but is only required to apply pressure to the file to achieve the necessary reciprocating movement of the file across the tooth. The upper channel shaped portion 11 of the support member 10 is provided with an opening 40 in order to permit the file 35 to pass therethrough when it is seated on the rollers 25 and 32. The tongue 41 is set to engage the upper face of the tooth to be sharpened, and thus provides a depth setting for the rollers 25 and 32 and hence the file 35. If desired, an adjusting screw may be provided to replace the tongue and permit adjustment of the depth setting, which may be necessary if the guide is used on different types of chains.

The pitch setting screw 45 is secured in the opening 46 in the upper portion of the support member, and the adjusting nut 47 threadably engages the screw 45. The tension spring 48 is provided between the end of the opening 46 and the nut 47 to provide a resistance against accidental movement of the nut 47 once it has been set. As can be seen in FIG. 2, the nut 47 contacts the rear end of the tooth adjacent to the tooth to be sharpened, and thus by operation of the nut 47 the position of the file line in relation to the tooth to be sharpened may be set. In use, the device is set up on the chain so that the edge of the tooth to be sharpened projects beyond the tongue 41 by the amount intended to be removed during the sharpening action. The adjusting screw is then set in order to abut the rear face of the next adjacent tooth. The sharpening operation is then carried out by moving the arm 28 in a clockwise direction and inserting the file 35 to seat on the rollers, and then operating the file until the arm 28 is moved to the maximum extent in the anti-clockwise direction, whereupon pressure is ceased to be applied to the file via the spring 34 and hence the cutting action between the file and the tooth will cease. The support member is then released from the chain and advanced therealong until the nut 47 abuts the rear face of another tooth and the support member is then again clamped to the chain. The next tooth is now sharpened by use of the file seated on the rollers and upon the arm moving to the limit of its travel the sharpening operation again ceases. By retaining the nut 47 in this set position as the sharpening operation continues along all teeth, a constant pitch is achieved between the teeth of the chain at the same time as they are sharpened, and thus any variation in the pitch resulting from uneven wear of the teeth is corrected.

The embodiment shown in FIG. 4 is the same basic construction as the guide device shown in FIGS. 1 to 3, however the support member is not arranged to be clamped onto the chain as is the case in the embodiment shown in FIGS. 1 to 3 but is attached directly to the blade 9 of the saw. Provision may also be made to lock the chain relative to guide device. The support member 10A is basically of a channel cross-section shape with one leg of the channel extended as at 10B and provided with two spaced apertures to receive attachment bolts and nuts 49. The blade 9 of the saw as manufactured, is provided with suitably located apertures to receive the bolts 49 and thus the support member 10A may be directly bolted to the blade 9. The support member 10A may have attached thereto a carrier plate 18 similar to that previously described with respect of FIGS. 1 to 3 and may include the arm 28 and the pair of rollers 25 and 32 also as described in respect to FIGS. 1 to 3. The carrier plate 18 would be adjustably mounted on the support member so that it may be lowered in relation to the blade and chain to maintain the correct height of the rollers relative to the chain teeth as the teeth wear and are subjected to successive sharpening. The support member 10A may also include the pitch setting screw 56 and adjusting nut 47 as described with respect to FIGS. 1 to 3.

As the form of the guide device shown in FIG. 4 is designed for attachment to the blade of a specific chain saw, the extent of adjustment of the inclination of the file line may be limited to the particular angle of the cutting edge on that particular saw. Thus the carrier plate 18 could be constructed so that the file line had the required inclination when locked at the respective limits of movement determined by the length of the slot 21.

However in the simplified form shown in FIG. 4 and 4A the carrier member 18B carries rollers 25A and 35A with the diameter and axial spacing of the rollers selected so that the file may be located in either of two alternate positions as indicated in FIG. 4A to give the required opposite inclinations of the file line. The bridge portion 65 of the carrier member 18B is inclined in the vertical plane and seats upon a similarly inclined ramp portion 10c on the support member 10A. The inclination is equal to that of the top face 8A of the chain teeth.

The carrier member 18B may be moved along the ramp 10c to adjust the height of the rollers relative to the teeth and is locked in the required position by a screw extending through the slot 67, and nut 69.

Also to sharpen some saws, such as chisel tooth chain saws, the axes of the rollers may be inclined to the vertical so that the rotation plane of the roller is inclined to the horizontal. For example to sharpen a chisel tooth chain saw said plane would be inclined at 10° to the horizontal. This inclination may be achieved by setting the roller axes at a preselected inclination or by attaching the carrier member in an adjustable manner to the support member.

It is to be appreciated that this construction of carrier member using rollers rotatable on fixed spaced axes may also be incorporated in the guide device shown in FIGS. 1 to 3 but then the teeth may only be sharpened at a preset angle.

As the support member 10A is fixed to the blade, the chain may be moved through the support member to bring each tooth in sequence into the required relationship to the rollers to effect sharpening thereof. The spring finger 39 has a slot 39A is adjustably attached to the support member by the lock nut 39B, and is set to engage the rear face of a tooth when the adjacent tooth is in the correct position for sharpening, and is deflected upwardly to permit the teeth of the chain to move therepast during the advancing of the chain to bring successive teeth into the position for sharpening.

Referring now to FIGS. 5 and 6 of the drawings, the file guide shown therein is specifically designed for use in sharpening a conventional hand saw having a blade 50 and a plurality of teeth 51. The support member 52 is of an inverted generally U-shaped cross-section with the base portion of the "U" enlarged to accommodate the increased width resulting from the set of the teeth of the saw. The support member 52 is provided with a notch 53 extending through the base and the adjacent portion of the sides of the support member so that a small number of teeth of the saw are exposed when the support member is fitted to the saw blade. The carrier member 54 is made in two sections each pivotally attached to the support member by the screw 55 to rotate in unison thereabout. The upper section 54a of the carrier member 54 rotatably supports the rollers 62, and the nut 56 is attached to the upper section 54a so that it may rotate relative thereto, but may not move in the axial direction. Accordingly, by rotation of the nut 56 on the screw 55, the height of the rollers 62 relative to the teeth of the saw may be adjusted. The screw 58 is also attached to the support member 50 and extends through the arcuate slot 59 in the lower section 54b of the carrier member. The lock nut 60 is attached to the screw 58 and when tightened the complete carrier member may be locked relative to the support member at any selected inclination within the limits of the length of the slot 59 by tightening of the lock nut 58. The pair of rollers 62 are mounted on spindles 63 attached to the upper section 54a of the carrier member for rotation about respective parallel axes in a substantially vertical roller rotation plane. The peripheral surface of the rollers is in the shape of a V-shaped groove so that a conventional triangle file may be seated therein and reciprocated along the file line set by the position of the carrier member 54 to effect the sharpening of a tooth of the saw. (see below) The support member may be held by the hand of the operator and pressure is applied to maintain the file in cutting engagement with the edge of the tooth during the sharpening operation.

The guide device as described with respect to FIGS. 5 and 6 is of a simplified construction, however it should be understood that a carrier member similar to that shown in FIGS. 1 to 3 having one of the rollers mounted on a spring loaded movable arm could also be used in a guide device for sharpening hand saws. The form of the V shaped groove is selected in accordance with the form of the saw teeth to be sharpened. On a cross-cut saw the cutting edge is enclosed forwardly at 15° and thus the corresponding face of the groove in the roller is enclosed at 15°.

I claim:

1. A file guide device for use in sharpening the teeth of a saw having a saw plane comprising a support member adapted to be attached to a saw in a predetermined relation to the teeth of the saw, a pair of parallel rollers each having a peripheral surface and being mounted for rotation in a roller rotation plane on a respective axis, said rollers being carried by the support member, the peripheral surface of each roller defining a seat for a file to be used to sharpen the saw teeth, said roller rotation plane and the axes of the rollers being arranged so that, upon the support member being attached to the saw, the axis of a file seated in the seats of the rollers has an inclination to the saw plane substantially equal to the angle of the cutting edge of a saw tooth, at least one of said rollers being mounted on an independent member, said independent member being supported for limited movement relative to the support member to effect movement of the file axis toward or away from the cutting edge of said saw tooth when the support member is attached to the saw, and means operable for urging the independent member to move in a direction to move the file axis toward said cutting edge.

2. A file guide device as claimed in claim 1, including a carrier member mounted on the support member for limited angular movement relative thereto about an axis parallel to the axes of the rollers, said independent member being mounted on said carrier member, said one roller being rotatably mounted on said independent member, the other of said rollers being rotatably supported on said carrier member, the pivot axis of the carrier member being arranged such that, within said limited angular movement of the carrier member, the file axis is movable in either direction from a neutral position transverse to the saw plane to an angle equal to the angle of the cutting edge, and means for locking the carrier member at a selected angle within said limited angular movement.

3. A file guide device as claimed in claim 1 including height gauge means on the support member spaced upwardly from the file axis and located to engage the top face of the tooth to be sharpened when the support member is fitted to the saw, whereby the position of the file line relative to the height of the tooth is set.

4. A file guide device as claimed in claim 1 including pitch gauge means on the support member spaced from the file axis in the direction of the length of the saw and located to engage a tooth of the saw when the support member is fitted to the saw whereby the pitch of the teeth after sharpening is set by said spacing.

5. A file guide device as claimed in claim 4 wherein the pitch gauge means is adjustable relative to the support member to vary the spacing from the file axis.

6. A file guide device as claimed in claim 1 wherein the support member includes means for releasably securing the support member to the chain of a chain saw.

7. A file guide device as claimed in claim 1 wherein the support member includes means for releasably securing the support member to the blade of a chain saw.

8. A file guide device for use in sharpening the teeth of a saw having a saw plane comprising a support member adapted to be fitted to a saw in a predetermined relation to the teeth of the saw, a pair of parallel rollers each having a peripheral surface and being mounted for rotation in a roller rotation plane on a respective axis, said rollers being carried by the support member, the axes of the rollers being in a fixed location with respect to the support member and arranged so that the roller rotation plane is substantially horizontal, the peripheral surface of each roller defining a seat for a file to be used to sharpen the saw teeth, means mounting the rollers for disposing the axes of said rollers at a predetermined distance from one another and with the rollers on respective opposite sides of the saw plane when the support member is fitted to the saw, said predetermined distance being related to the diameter of the rollers for providing a file to be seated on both the rollers in either of two positions of equal and opposite inclination to the saw plane, said inclinations being substantially equal to the angles of the cutting edges of the saw teeth.

* * * * *

UNITED STATES PATENT AND TRADEMARK OFFICE
CERTIFICATE OF CORRECTION

PATENT NO. : 4,131,038
DATED : December 26, 1978
INVENTOR(S) : Cornelis J. Beerens It is certified that error appears in the above-identified patent and that said Letters Patent are hereby corrected as shown below:

Column 7, line 64, change "(see below)" to --The form of the V shaped groove is selected in accordance with the form of the saw teeth to be sharpened. On a cross-cut saw the cutting edge is enclosed forwardly at 15° and thus the corresponding face of the groove in the roller is enclosed at 15°.--

Column 8, lines 6-11, delete "The form of the V shaped groove...enclosed at 15°."

Column 10, line 3, change "of said rollers at" to --thereof--.

Signed and Sealed this

Twenty-eighth Day of August 1979

[SEAL]

Attest:

Attesting Officer

LUTRELLE F. PARKER
*Acting Commissioner of Patents and Trademarks*